US007277043B2

(12) United States Patent
Arthur et al.

(10) Patent No.: US 7,277,043 B2
(45) Date of Patent: Oct. 2, 2007

(54) TACTICAL AIRCRAFT CHECK ALGORITHM, SYSTEM AND METHOD

(75) Inventors: William C. Arthur, Arlington, VA (US); Daniel B. Kirk, Vienna, VA (US)

(73) Assignee: The MITRE Corporation, McLean, VA (US)

( * ) Notice: Subject to any disclaimer, the term of this patent is extended or adjusted under 35 U.S.C. 154(b) by 392 days.

(21) Appl. No.: 10/995,173

(22) Filed: Nov. 24, 2004

(65) Prior Publication Data

US 2006/0109166 A1 May 25, 2006

(51) Int. Cl.
*G01S 13/00* (2006.01)
*B64C 11/00* (2006.01)

(52) U.S. Cl. ............................ 342/29; 701/4; 342/195; 342/196; 342/27; 342/28; 342/40

(58) Field of Classification Search ................ 342/195, 342/196, 46, 49, 27–28, 29–40; 701/4
See application file for complete search history.

(56) References Cited

U.S. PATENT DOCUMENTS 4,839,658 A * 6/1989 Kathol et al. ............... 342/455
4,926,171 A * 5/1990 Kelley ........................ 340/961
5,434,577 A * 7/1995 Baghdady ................... 342/380
5,487,516 A * 1/1996 Murata et al. .......... 246/182 C
5,794,172 A * 8/1998 Matheson et al. .......... 701/117
6,393,358 B1 * 5/2002 Erzberger et al. ........... 701/120
2002/0152029 A1 * 10/2002 Sainthuile et al. .......... 701/301
2003/0122701 A1 * 7/2003 Tran ............................ 342/29
2003/0200024 A1 * 10/2003 Poreda ....................... 701/120
2006/0089760 A1 * 4/2006 Love et al. .................... 701/4

OTHER PUBLICATIONS

Tatjana Bolic et al. (University of California at Berkeley—UCB-ITS-RR-2002-3, ISSN 0192 4095).*
Anthony Warren (Boeing Commercial Aircraft Group- 1997 IEE-0-7803-4150-3/97).*
Jimmy Krozel et al. (American Institute of Aeronautics and Astronautics, AIAA Aircraft Technology, Integration, and Operation Conf., Chicago, IL. Sep. 2004).*

* cited by examiner

*Primary Examiner*—Thomas H. Tarcza
*Assistant Examiner*—Hien Ly
(74) *Attorney, Agent, or Firm*—Sterne, Kessler, Goldstein & Fox P.L.L.C.

(57) ABSTRACT

A method of generating aircraft tactical alerts includes receiving track positions for two aircraft; receiving trajectories and static conformance bounds for the two aircraft; receiving current position for the two aircraft; generating tactical check segments and variable conformance bounds for the two aircraft based on the current position, the static conformance bounds, trajectory, adapted data, and the track positions; and generating a tactical alert if the variable conformance bounds overlap within a specified lookahead time. The variable conformance bounds can be either symmetric or asymmetric about projected tracks. The variable conformance bounds can use step functions, or continuously widening bounds up to the static conformance bounds. The variable conformance bounds can be based on modifying the static conformance bounds in two or three spatial dimensions.

14 Claims, 8 Drawing Sheets

TACTICAL AIRCRAFT CHECK ALGORITHM, SYSTEM AND METHOD

STATEMENT REGARDING FEDERALLY-SPONSORED RESEARCH AND DEVELOPMENT

Statement under MPEP 310. The U.S. government has a paid-up license in this invention and the right in limited circumstances to require the patent owner to license others on reasonable terms as provided for by the terms of contract No. DTFA01-01-C-00001, awarded by the Federal Aviation Administration.

BACKGROUND OF THE INVENTION

1. Field of the Invention

The present invention relates to Air Traffic Control (ATC) automated aircraft conflict prediction, and, more particularly, to strategic, trajectory-based methods that utilize surveillance data (e.g., radar position reports) to monitor trajectory accuracy.

More particularly, the present invention relates to the reevaluation of variable conformance bounds and predicted aircraft positions over the first several minutes of lookahead time based on the observed aircraft track and navigational equipage. Further, it relates to a system and method for providing timely updates based on observed track positions.

2. Related Art

In conventional methods, accuracy monitoring is accomplished by comparing the position report with the position predicted from the trajectory for the given time. If the position difference is greater than some 3-dimensional allowance (termed "conformance bounds"), the trajectory may be regenerated to conform with the position data. However, if the position report is within the conformance bounds, no new trajectory is generated; this is done both for computational efficiency, and to maintain trajectory stability (e.g. for stable alert presentation). The present invention improves on these methods, by improving the accuracy of predicted aircraft conflicts over the first several minutes of lookahead time (tactical alerts) while maintaining both computational efficiency and the stability of predicted conflicts at longer lookahead times (strategic alerts)

An example of a conventional system that uses conformance bounds is the Federal Aviation Administration's User Request Evaluation Tool (URET). URET includes decision support capabilities to assist en route sector controllers to predict conflicts between aircraft (i.e., alerts due to proximity of two aircraft to each other), as well as between aircraft and special use or designated airspace. It also provides trial planning and enhanced flight data management capabilities.

Typically, the information about each aircraft includes its flight plan, current altitude, position, speed, direction, type of aircraft, etc. URET builds a trajectory for each aircraft using this information, atmospheric data, and adapted data (e.g., aircraft performance data, FAA adaptation data). A trajectory is a four dimensional (4-D) representation of the expected path of the aircraft. A trajectory includes a centerline modeled by a time-ordered sequence of cusps that describe nominal 4-D positions (X, Y, Z, t) and conformance bounds (lateral, longitudinal, and vertical distances) that define how far from a nominal position the track position can be before a trajectory is rebuilt. Trajectories are subdivided into segments that represent portions of a trajectory that can be modeled by constant speed, gradient, course, and conformance bounds. Each segment starts and ends at a cusp; the cusps contain the segment modeling parameters.

URET static conformance bounds are a constant magnitude at all lookahead times along a trajectory segment. The conformance bounds depend on the aircraft navigational equipment (e.g., area navigation). Lateral conformance bounds currently extend either 2.5 nautical miles (nm), or 3.5 nautical miles from the trajectory centerline along straight segments, depending on the aircraft navigational equipage. Note also that there is also a vertical tolerance (vertical conformance bounds) and longitudinal tolerance (longitudinal conformance bounds). Lateral and longitudinal conformance bounds are larger than the standard conformance bounds near large turns or for military formations. Vertical conformance bounds are increased near the start or end of altitude transitions. URET trajectories are updated to include observed speed, vertical rates, and course if a track position exceeds any conformance bound (lateral, longitudinal, or vertical) for more than a specified parameter number of consecutive reports.

Alerts are identified by determining if two aircraft trajectory conformance bounds have a loss of ATC separation standards (nominally 5 nm horizontally, and applicable vertical separation distance, e.g., 1000 feet at or below flight level (FL) 290, and 2000 feet vertically above FL290). If the conformance bounds have a simultaneous loss of horizontal and vertical ATC separation distances, the minimum separation distance between the trajectory centerlines is used to identify an alert color (red if the distance is less than or equal to a parameter distance (e.g., 5 nm); otherwise the alert is yellow).

The magnitude of the conformance bounds affects the number of trajectories, the number of correct alerts (alerts where the actual minimum separation distance—if no controller intervention occurred—would be less than or equal to a parameter distance e.g., 8 nm), the number of false alerts (alerts where an actual minimum separation distance would be greater than a parameter distance e.g., 8 nm), and the alert warning time before a predicted conflict start time.

For predicted alerts that start within a few minutes of the "current time," constant magnitude conformance bounds identify some aircraft pairs with a predicted horizontal minimum separation distance (e.g., 10 nm) that is significantly larger than the Air Traffic Control horizontal separation requirement (e.g., 5 nm). Reducing the size of the conformance bounds will reduce the number of false alerts, but increase the number of missed alerts. Additionally, a reduction in these bounds would reduce trajectory stability. This stability is needed to ensure strategic conflicts do not change unless the aircraft positions are significantly different from the trajectory.

One desired improvement is to reduce the number of displayed alerts without significantly altering the strategic conflict probe notifications. In particular, alerts that have a predicted start time close to the current time (termed "short warning time alerts") require improvements to better match a continuous track-based update.

Accordingly, there is a need to reduce the number of false alerts in the tactical timeframe, without a corresponding degradation in the number of missed alerts or trajectory stability.

SUMMARY OF THE INVENTION

The present invention relates to an aircraft Tactical Check (TC) algorithm, system and method that substantially obviates one or more of the disadvantages of the related art.

More particularly, in an exemplary embodiment of the present invention, a method of generating aircraft tactical alerts includes receiving tracks and trajectories for two aircraft including static conformance bounds for the two aircraft; receiving current trajectory position for the two aircraft; generating Variable Conformance Bounds (VCBs) and Tactical Check Segments (TCSs) for the two aircraft based on the current trajectory position, the static conformance bounds, adapted data, and the tracks; and generating a tactical alert if the VCBs have a loss of ATC separation standards within a specified lookahead time. The VCBs can be either symmetric or asymmetric about TCSs. The VCBs can use step functions, or continuously widening bounds up to the static conformance bounds. The VCBs can be applied in two or three spatial dimensions.

Further, this invention provides a computationally efficient method to periodically reevaluate displayed conflicts (alerts) with an objective to delete alerts in a more timely manner and consistent with a flight's track data (e.g., in response to an aircraft maneuver to increase separation distance). The reevaluation process also provides a more accurate estimate of the predicted minimum separation distance for tactical alerts that are not deleted by the reevaluation.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to embodiments of the present invention, examples of which are illustrated in the accompanying drawings.

Figure 1:
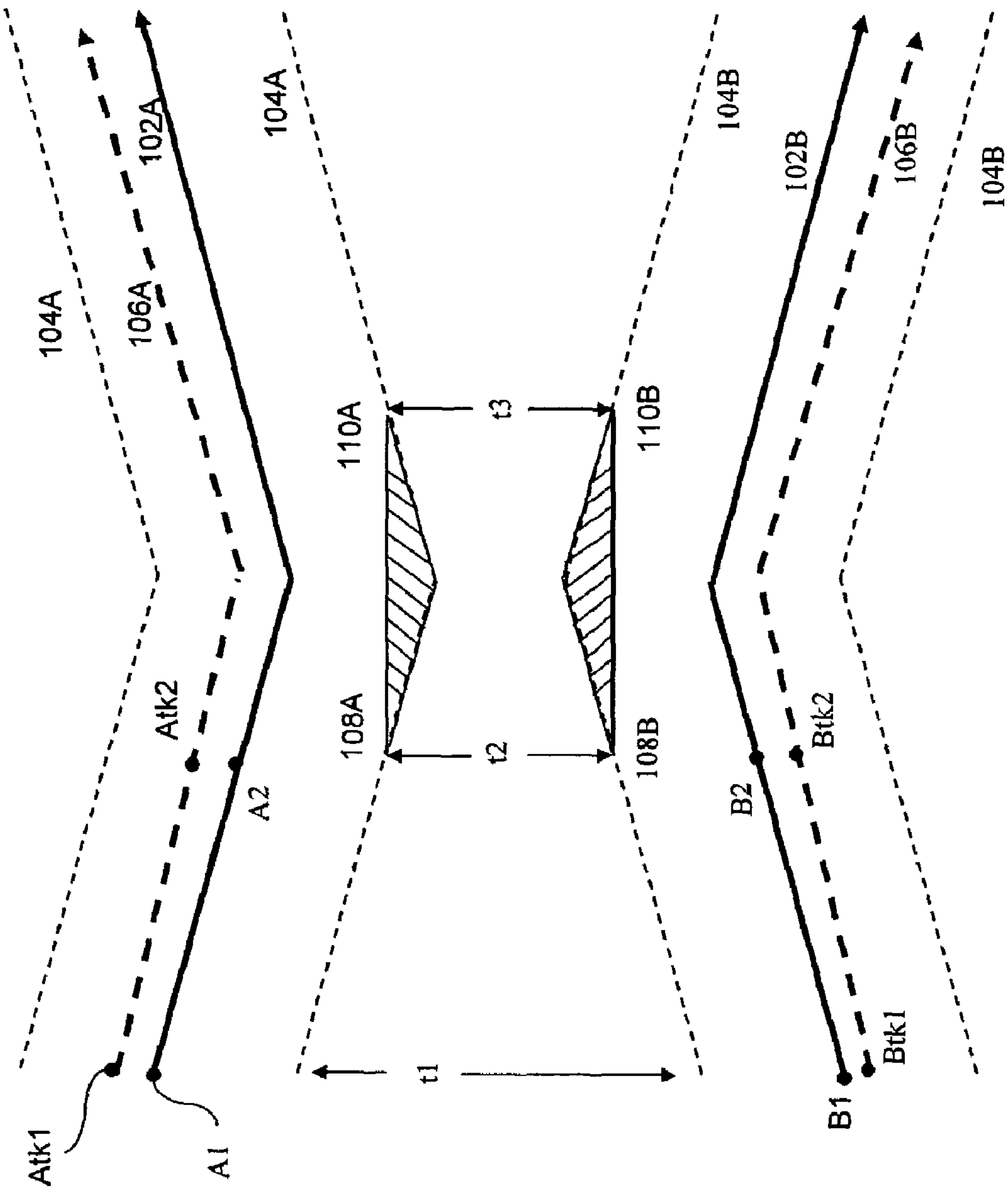
FIG. 1 illustrates how an alert is generated.

FIG. 1 illustrates how an alert may be generated. As shown in FIG. 1, two aircraft have trajectories centerlines 102A, 102B respectively, which represent their expected future tracks. Each of these trajectories is "bounded" by static conformance bounds 104A, 104B, which represent corridors within which the two aircraft may occupy for this trajectory without a trajectory update. These conformance bounds 104A, 104B typically depend on the type of aircraft and its navigational equipment, and are currently either 2.5 nautical miles (nm), or 3.5 nautical miles. Note also that there is also a vertical tolerance (vertical conformance bounds) and longitudinal tolerance (longitudinal conformance bounds), which are not shown in this figure. Note also that the conformance bounds are static (constant) entities along a trajectory segment. Also, lateral and longitudinal conformance bounds are larger than the standard conformance bounds near large turns or for military formations, and vertical conformance bounds are increased near the start or end of altitude transitions.

Normally, the alerts are generated for events that start several minutes forward into the future, for example, five minutes "lookahead time," or 15 minutes lookahead time. In other words, in FIG. 1, the aircraft trajectory positions at $t=t_1$ are presumed to be at points A1 and B1, respectively. At some future time $t_2$, the nominal aircraft trajectory position will presumably be at points A2 and B2 respectively.

The interval 108 to 110 in FIG. 1 is where the two aircraft traveling along the trajectory centerlines 102A, 102B would generate an alert. The predicted conflict start positions 108A, 108B at time t2 are the earliest positions where the conformance bounds have a distance less than or equal to the required ATC minimum separation distance (horizontally nominally 5 nm). The predicted conflict end positions 110A, 110B at time t3 are the latest positions where the conformance bounds have a distance less than or equal to the required ATC minimum separation distance.

However, the actual tracks usually differ from nominal trajectory centerline. In FIG. 1, actual tracks of the aircraft are shown as 106A, 106B. In other words, the two aircraft are in reality further apart than would be calculated from their nominal trajectory positions 102A, 102B. In this case, they may be far enough apart that no alert should be triggered. At time t2 the actual aircraft positions, points Atk2 and Btk2, are assumed to be left and right of the respective nominal positions A2 and B2. If the actual positions occur along lines 106A and 106B, a false alert would be generated due to the loss of ATC separation standard between the conformance bounds in area 108 to 110.

The present invention reduces the number of alerts, and improves the accuracy and stability of the displayed alerts. This is achieved by:

(1) Creating VCBs (variable conformance bounds) over the tactical lookahead time (first few (8) minutes of lookahead time) to more accurately represent predicted position uncertainty;

(2) Creating TCSs (tactical check segments) over the tactical lookahead time to account for the lateral track offset distance and VCBs, and (3) Re-evaluating alerts (using the TCSs and VCBs) before notification, or periodically re-evaluating displayed alerts that have a time to predicted conflict start time that is less than the TC (tactical check) lookahead time from the current time.

Detailed methods for each of the above items (1-3) are provided in the following subsections.

Figure 2:
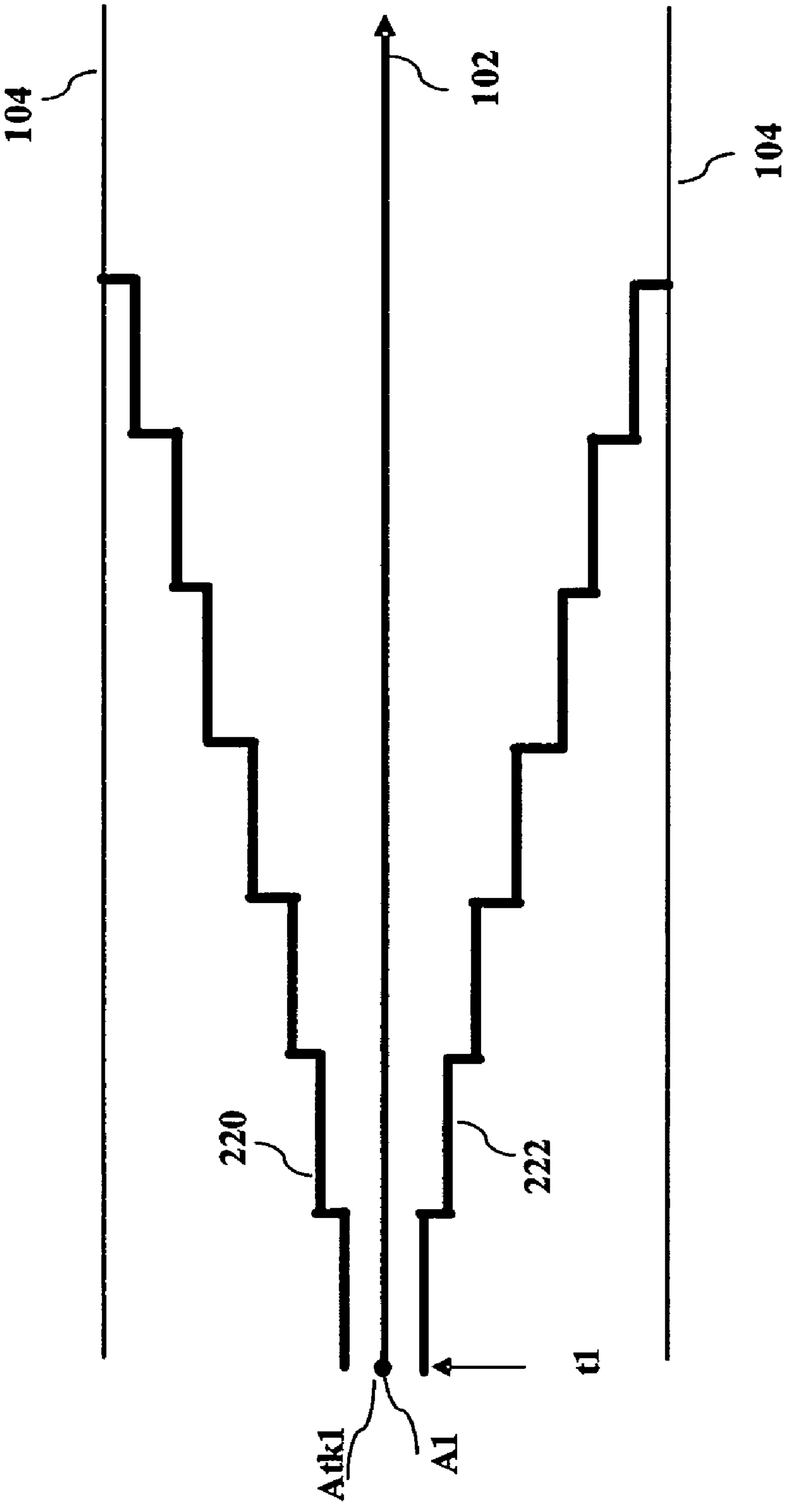
FIG. 2 shows lateral VCBs (variable conformance bounds) as a step function modeled from a track position on the trajectory centerline.

Creating VCBs. FIG. 2 illustrates symmetric lateral VCBs modeled as step functions at each minute of lookahead time, when the track position is on a trajectory centerline. VCBs model the growth of position predictions along a trajectory in the lateral, longitudinal, and vertical dimensions. Conformance bound growth rates may be determined from measured track-trajectory deviation data (using some number of standard errors). The inventors have found that lateral VCBs can reduce the number of alerts up to 8 minutes of lookahead time without introducing excessive instability in displayed alerts. VCBs may also apply to the longitudinal and vertical dimensions.

As shown in FIG. 2, the lateral VCBs can be represented by a number of step functions that project forward in time and in space, with the conformance bounds gradually widening left 220 and right 222 of the trajectory centerline 102 as the aircraft position is computed for some time further and further into the future. For example, in the example shown in FIG. 2, the VCBs expand symmetrically and do not move outside the static lateral conformance bound 104, given that the track position of the aircraft Atk1 at time $t_1$ is known and on the trajectory centerline 102.

Figure 3:
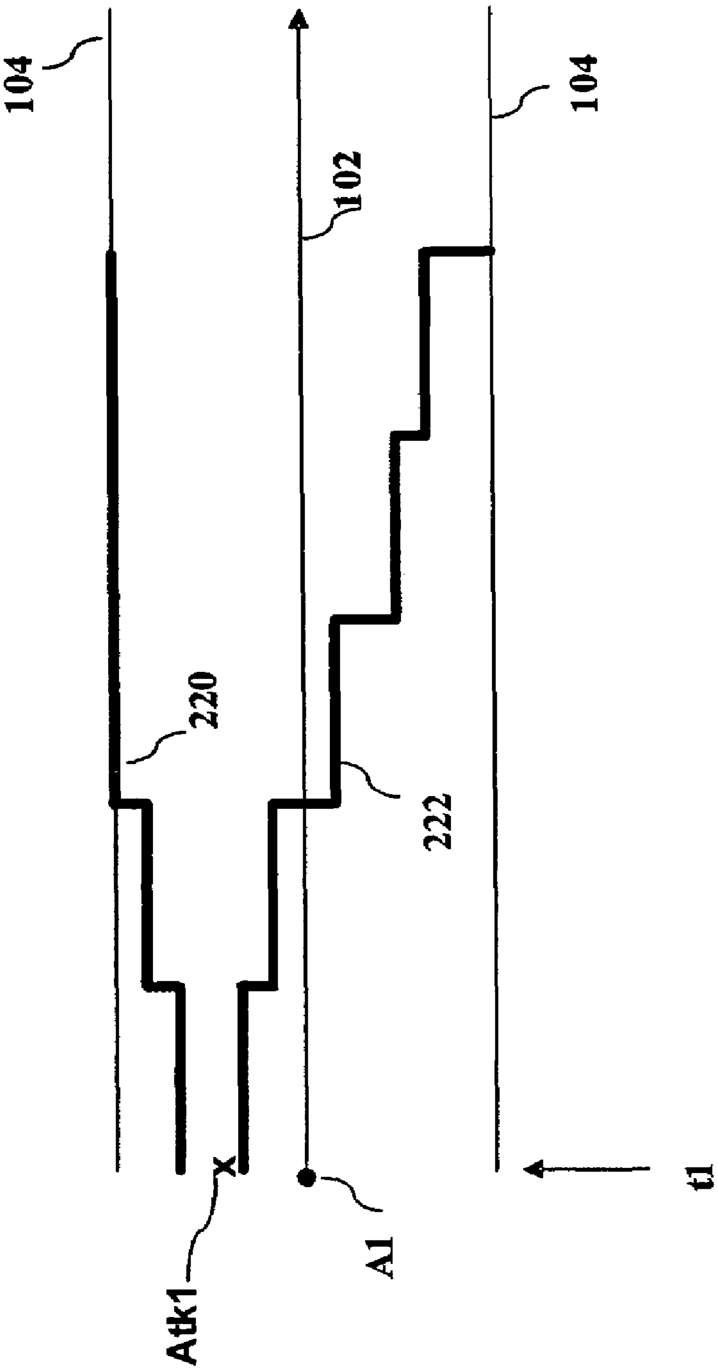
FIG. 3 shows lateral VCBs modeled from a track position not on the trajectory centerline.

FIG. 3 illustrates the situation where the current aircraft position Atk1 at $t=t_1$ is offset from the trajectory centerline 102. In that case, an asymmetrical VCB step function is used, such that the VCB to the left (220) does not move outside the static lateral conformance bound 104. The VCBs to the right (222) expand outwards to the right static lateral conformance bound 104 at a longer lookahead time.

TCS lateral VCBs from the trajectory centerline are built as follows. Default lateral VCBs are modeled as distances from the track offset distance, where track offset distance is the perpendicular projection from the track position to the trajectory segment associated with the current time on the trajectory 102. Default lateral VCBs may be derived from either a table look-up or a continuous function that models the increase in lateral positional uncertainty as a function of lookahead time. For this description, it is assumed that track offset distance is negative for positions left of the trajectory and positive for positions right of the trajectory. Thus, a left VCB is the left default VCBs subtracted from the track offset distance; a right VCB is the right default VCB added to the track offset distance. VCBs are truncated if they exceed the static conformance bound, including special increments (e.g., turns).

For example, a table of default VCBs is illustrated in Table 1, where a left and right lateral VCB data structure is presented for lookahead times up to 8 minutes, three categories of track offset distance from a trajectory centerline, and one type of navigational equipment. This example assumes a static conformance bound distance of 1.5 nm. Left and right default VCBs may have different values depending on the track offset distance. As an example, if the track offset distance is −1.0 nm, then at one minute lookahead time, a left VCB would be −2.0 nm and a right VCB is 0.2 nm. If the static lateral conformance bound in this example is assumed to be 1.5 nm, the left VCB would be truncated to −1.5 nm from the trajectory centerline. Note, as illustrated, the lateral VCBs can apply to strategic conformance bounds smaller than the 2.5 nm and 3.5 nm discussed above.

TABLE 1

Example default lateral VCB table structure

| Track Offset Distance from Trajectory | VCB Side | Lookahead Time (minutes) 1 | 2 | 3 | 4 | 5 | 6 | 7 | 8 |
|---|---|---|---|---|---|---|---|---|---|
| −.9 to −1.5 nm | Left (nm) | 1.0 | 1.0 | 1.0 | 1.0 | 1.0 | 1.5 | 1.5 | 1.5 |
| | Right (nm) | 1.2 | 1.2 | 1.4 | 1.8 | 2.1 | 2.1 | 2.1 | 3.0 |
| .9 to −.9 nm | Left (nm) | 0.6 | 0.7 | 0.8 | 0.8 | 1.0 | 1.2 | 1.3 | 1.5 |
| | Right (nm) | 0.6 | 0.7 | 0.8 | 0.8 | 1.0 | 1.2 | 1.3 | 1.5 |
| .9 to 1.5 nm | Left (nm) | 1.2 | 1.2 | 1.4 | 1.8 | 2.1 | 2.1 | 2.1 | 3.0 |
| | Right (nm) | 1.0 | 1.0 | 1.0 | 1.0 | 1.0 | 1.5 | 1.5 | 1.5 |

Note that although in FIGS. 2 and 3 the VCBs are shown as step functions, continuous functions may be employed as well. These may be, e.g., asymptotic functions, linear functions, etc.

It will be appreciated that the approach of using VCBs described above with reference to FIGS. 2 and 3 may be combined with reducing the static conformance bounds with reference to FIG. 1. It will also be appreciated that although one embodiment of the invention uses VCBs in three spatial dimensions (X,Y,Z), the invention is also applicable to the use of VCBs in just two dimensions (e.g., X and Y).

Creating TCSs. To check for conflicts, a TCS structure is built that models the VCBs and centerline positions for a sufficient lookahead time to a time where the trajectory is rejoined. TC cusps (points where gradient, speed, course, or conformance bound magnitude change) are required at each time where the VCBs change or a cusp occurs in the trajectory. TCSs are modeled between consecutive TC cusps.

Figure 4:
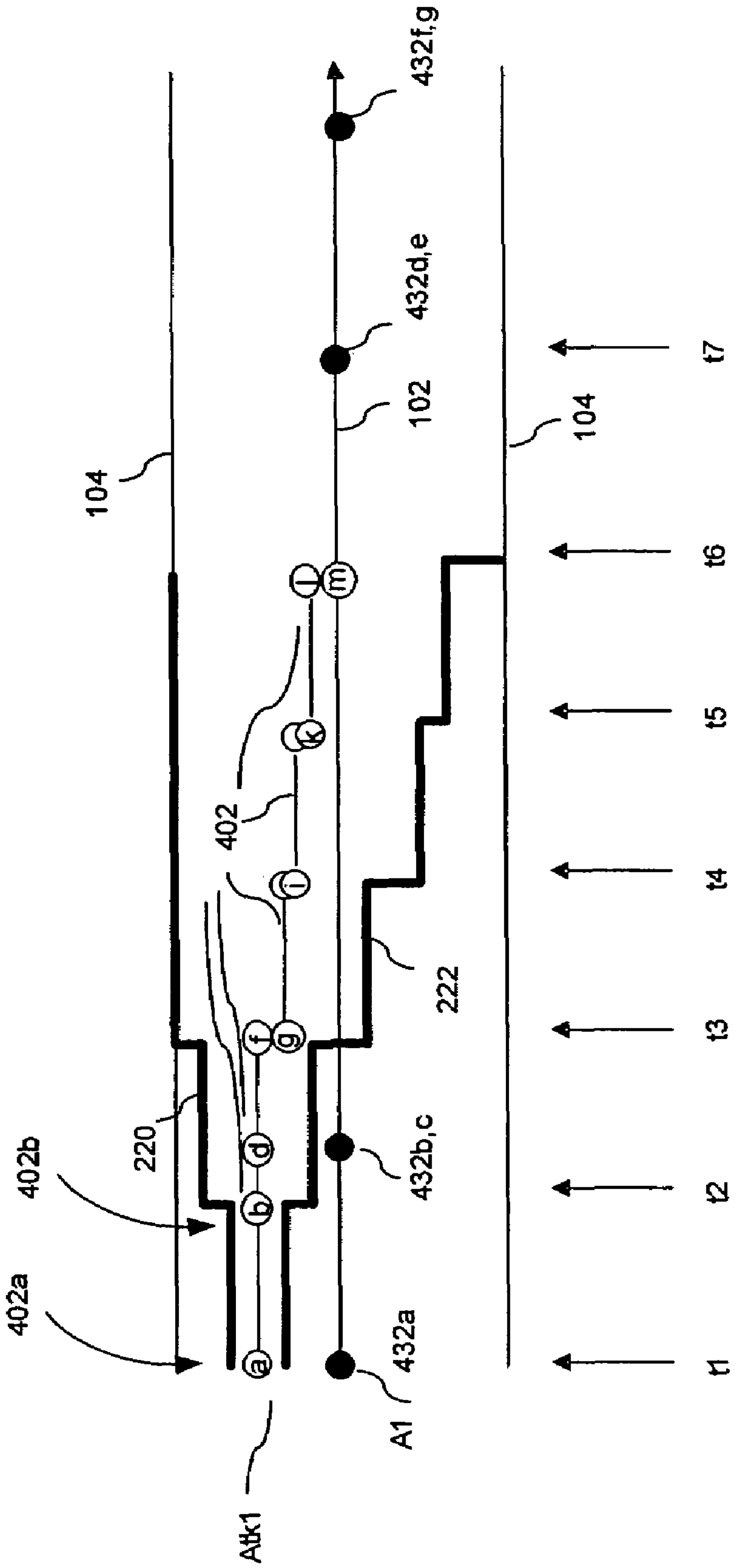
FIG. 4 illustrates TCSs (tactical check segments) with VCBs.

FIG. 4 illustrates lateral VCBs 220, 222 and TCSs 402 over the TC lookahead time to a cusp 432*d* where the TCSs rejoin the trajectory 102. The lateral VCBs (left 220 and right 222) increase in magnitude based on the expected track-trajectory differences over the TC lookahead time (in this case as described in FIG. 3). The lateral VCBs are bounded by the trajectory 102 static lateral conformance bounds 104 (e.g., in FIG. 4, left VCB is truncated at t3 and right VCB is truncated at t6). The lateral VCBs are contained within the static lateral conformance bounds since they model a smaller lateral uncertainty.

TCSs (see FIG. 4) are built to determine positions that are centered within the lateral VCBs 220 and 222, and are a parallel offset from the trajectory. Each TCS has a start and an end cusp (e.g., 402*a*, 402*b*). The line from a TC cusp position (e.g., 402*a*, 402*b*) to the trajectory position at the cusp time (e.g., t1 or t2) is perpendicular to the trajectory centerline segment. The time at the end cusp of one TCS and the time at the start cusp of the next TCS are equal. The horizontal position at the end cusp of one segment and the horizontal position at the start cusp of the next segment may be the same, or they may be different.

The first step to build TCSs is to determine an ordered list of TC cusp times that define the start and end of each TCS. TC cusp times are added to the list for each trajectory cusp time (e.g., 432*a*, 432*b*) at or after the current time, and up to and including the first trajectory cusp (termed trajectory rejoin cusp time, e.g., 432*d*) with a time that is greater than or equal to the current time plus a predefined time interval TC Maximum Lookahead Time.

Next, TC cusp times are also added to the TC cusp time list at the current time and every predefined interval (e.g., every 1 minute at t2 through t6) up to and including the TC Maximum Lookahead Time to model VCBs. If the cusp time at the TC Maximum Lookahead Time is not a trajectory cusp time, one additional TC cusp time is added to the TC cusp time list. The TC cusp times are unique with ascending time order. TCSs start and end times are derived from the time-ordered cusp times. Each TC cusp time in the list is the start time of a TCS (except for the last entry in the list); the end time of a TCS is the next TC cusp time in the list. The end time of the last TCS is the trajectory rejoin segment cusp time (e.g., t7).

The TCS may include a pointer to the trajectory rejoin segment cusp. After the trajectory rejoin cusp, the TCSs and the trajectory segments are identical (e.g., trajectory segment defined by cusps 432*e* and 432*f*). Table 2 illustrates the start and end times for a TCS structure built from trajectory segments using cusps in FIG. 4.

TABLE 2

Illustration of TCS time interval construction

| Trajectory Segments | | | |
|---|---|---|---|
| Cusp Id | Start Time | Cusp Id | End Time |
| 432a | 10:00:00 | 432b | 10:01:20 |
| 432c | 10:01:20 | 432d | 10:07:00 |
| 432e | 10:07:00 | 432f | 10:15:00 |
| 432g | 10:15:00 | 432h | 10:22:00 |
| **TCSs** | | | |
| Cusp Id | Start Time | Cusp Id | End Time |
| 402a | 10:00:00 | 402b | 10:01:00 |
| 402c | 10:01:00 | 402d | 10:01:20 |
| 402e | 10:01:20 | 402f | 10:02:00 |
| 402g | 10:02:00 | 402h | 10:03:00 |
| 402i | 10:03:00 | 402j | 10:04:00 |
| 402k | 10:04:00 | 402l | 10:05:00 |
| 402m | 10:05:00 | 402n | 10:07:00 |
| | Pointer to trajectory cusp 432e | | |

For each TCS cusp, additional variables needed for TC Automated Problem Detection (APD): such as speed, course, gradient, altitude, longitudinal conformance bound, and vertical conformance bound are derived from the associated trajectory segment. The associated trajectory segment is determined by the trajectory position at the TC cusp time.

Re-evaluating alerts. The TC procedure is initiated for the following events to determine aircraft that require new TCSs and strategic conflicts that require reevaluation:

(1) A new strategic conflict is detected on a trajectory (2) Due to the clock timer event, a strategic conflict becomes a tactical alert or the time since last re-evaluation of the TCS in an active tactical alert is greater than a specified parameter (e.g., 1 minute).

Figure 5:
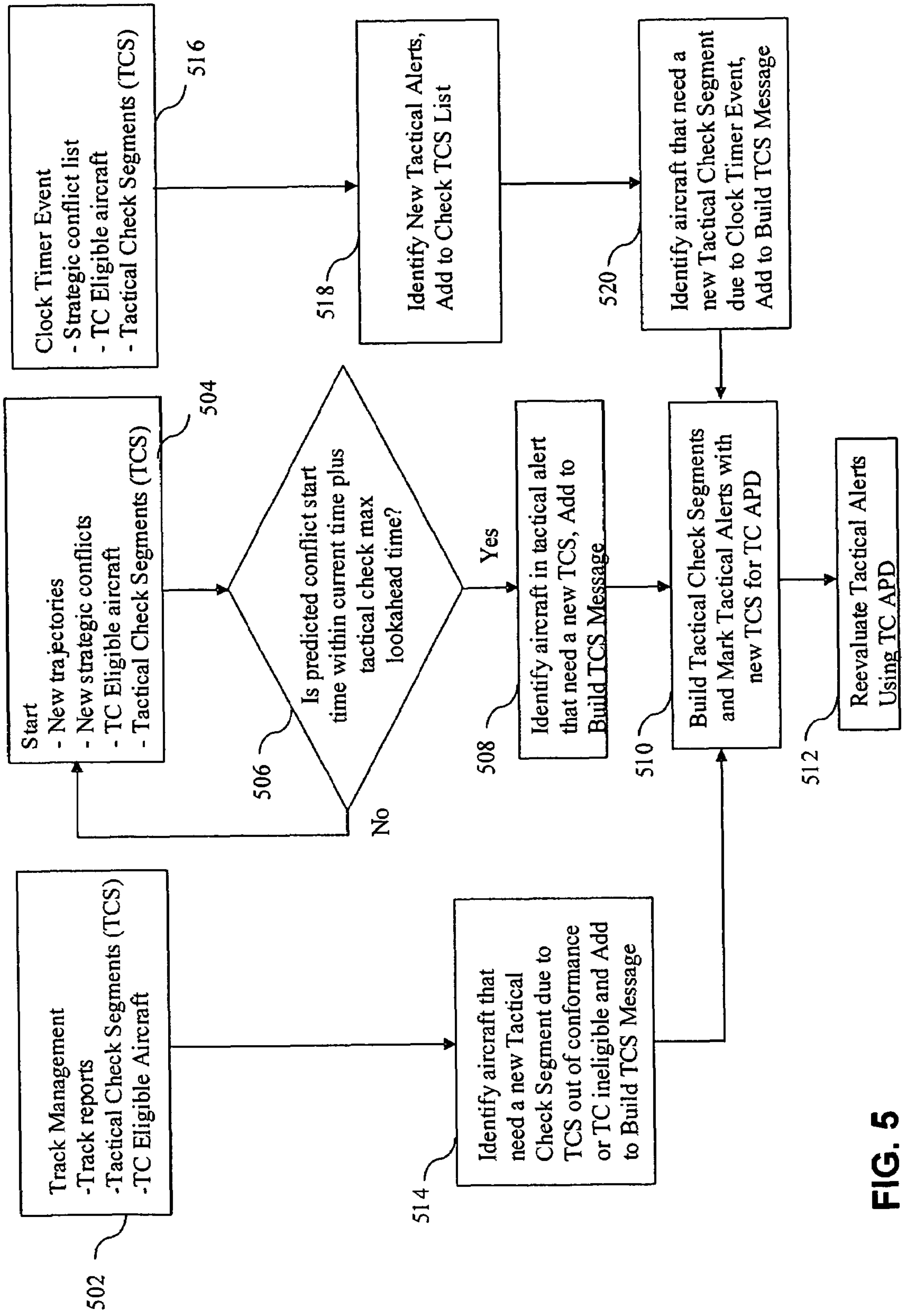
FIG. 5 is a representation of a flow chart in the present invention for a TC (tactical check) process to re-evaluate strategic conflicts.

(3) New track reports are received, and an aircraft has a track position that is out of conformance with the TCS lateral conformance bound, or an aircraft in a tactical alert is no longer TC eligible Referring to FIG. 5, which shows a flow chart diagram of the TC re-evaluation procedure, the TC procedure determines aircraft that require a new TCS without invoking the reconformance function and reevaluates each tactical alert that involves an aircraft with a new TCS. Alerts that are reevaluated can be deleted before notification, removed from an existing display, or have a changed severity level (color) or predicted conflict start time. In a few cases, a previously deleted alert may need to be redisplayed after reevaluation in TC APD. Tactical alerts deleted by TC APD are termed inactive alerts. A detailed discussion of FIG. 5 is provided below for each of the initiation events.

New Strategic Conflict. Referring to FIG. 5, the flow chart diagram of the TC re-evaluation procedure starts with block 504, where the data concerning new trajectories, new strategic conflicts on a trajectory, TCSs, and TC eligible aircraft are made available to the system. Trajectories are built for each aircraft after a flight plan is available, and whenever modifications are made to a trajectory, such as a flight plan amendment is received, or the system updates a trajectory for conformance with the track. Strategic APD (using trajectories and static conformance bounds) is run each time a new trajectory is built to determine new strategic conflicts. If an aircraft has TCSs, they are deleted whenever a new trajectory is built.

The TC process is started each time a new strategic conflict is found by strategic APD. In block 506, if a strategic conflict has a predicted conflict start time that is less than or equal to the current time plus a predefined parameter for the Maximum TC Lookahead Time (e.g., 8 minutes), it is marked as an active tactical alert and requires further processing. Otherwise, if block 506 is "No", the next new strategic conflict is processed by returning to block 504. If a new tactical alert is found in block 506, that is, block 506 is "Yes," each aircraft in the tactical alert is processed to determine if it requires a new TCS and, if so, the aircraft identifier is added to the Build TCS Message block 508. Additionally, since an aircraft can be involved in multiple tactical alerts, block 508 processing identifies aircraft in all interrelated tactical alerts that require TCSs, the details of which are shown in FIG. 6.

After all aircraft identifiers that require a new TCS are entered in the Build TCS Message, flow continues to block 510. In block 510, TCSs are built for each Build TCS Message entry and each tactical alert that involves an aircraft with a new TCS is marked for TC APD. TC APD block 512 is invoked for all strategic conflicts that include an aircraft with a new TCS.

Figure 6:
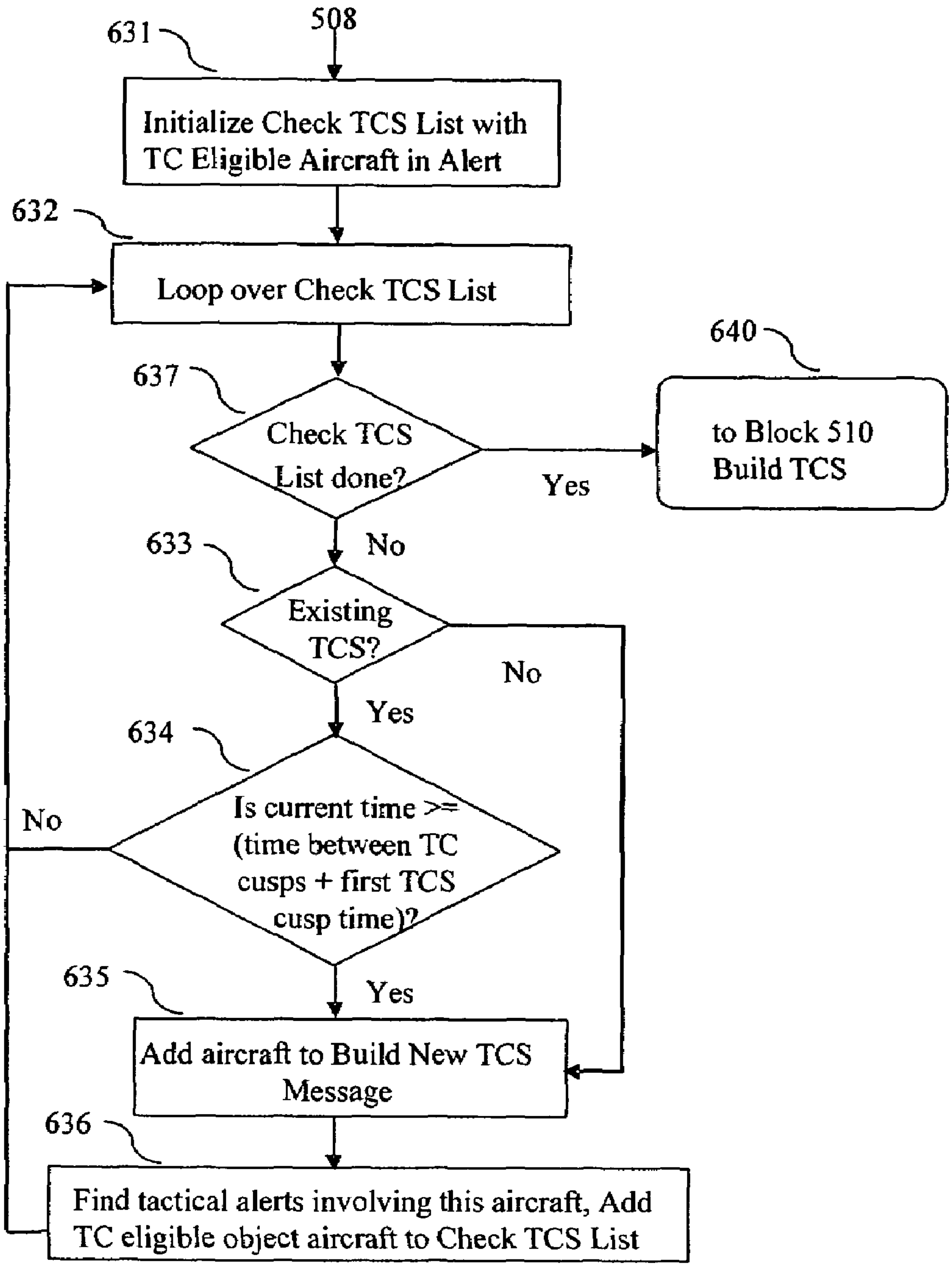
FIG. 6 is a representation of a flow chart to identify a list of aircraft that require TCSs due to a strategic conflict on a new trajectory.

Referring to FIG. 6, the procedure of block 508 starts in block 631, where a Check TCS List is initialized by adding each TC eligible aircraft in the alert to the Check TCS List. Each TC eligible aircraft in the Check TCS List is sequentially processed block 632. If the Check TCS List is not done, i.e., "No" in block 637, processing flows to block 633 ("Existing TCS?"). If i.e., "No" occurs in block 633, the aircraft is added to a Build New TCS Message in block 635.

Next, processing in block 636 identifies each active tactical alert that includes this aircraft and, for each such alert, if the object aircraft is TC Eligible, the object is added to the Check TCS List. After all tactical alerts have been checked, flow returns to block 632. Assuming the Check TCS List is not completed, that is block 637 is "No", and "Existing TCS?" block 633 is "Yes," flow continues to block 634 where an existing TCS is check to determine if it is to be updated due to the clock timer event. If "Current Time>>=Time Between TC Cusps plus First TCS Cusps Time?" is "Yes" in block 634, the aircraft is added to a Build New TCS Message 635.

Again, the flow continues to block 636 where each active tactical alert that includes this aircraft is identified and, for each such alert, if the object aircraft in the alert is TC Eligible, it is added to the Check TCS List. Flow returns to block 632 where processing continues as described above. If an aircraft has a TCS that does not need to be updated, block 634 is "No," flow returns to block 632 where processing continues until the Check TCS List is found to be completed in block 637. When all aircraft in the Check TCS List have been processed, "Check TCS List done?" block 637 is "Yes," and processing flows to block 640 where it returns to block 510 of FIG. 5.

Thus, block 508 processing identified all aircraft that need a new TCS in the original new tactical alert and each interrelated tactical alert. Although it is possible that all tactical alerts are checked for reevaluation in response to one new tactical alert, in practice only a few tactical alerts are reevaluated when a new tactical alert occurs.

Clock Timer Event. A second event to initiate the TC procedure is the clock timer event. Referring to FIG. 5 block 516, the TC procedure is invoked for advancement of the clock, "Clock Timer Event", where the strategic conflict list, TCSs, and TC Eligible aircraft are made available to the system. Due to the advancement of time, nominally every second, aircraft may require new TCSs if a strategic conflict becomes a tactical alert or existing TCS are older than a predefined time interval. As described above, each tactical alert that involves a new TCS is reevaluated in TC APD. Every second, new tactical alerts are identified and all TC eligible aircraft that are in any active tactical alert are added to Check TCS List in block 518. The flow continues to block 520 where each aircraft in the Check TCS List is processed to determine if it needs a new TCS, and, if so, the aircraft is added to a Build TCS Message. Processing details of blocks 518 and 520 are described below in more detail. After all aircraft that require a new TCS are entered in the Build TCS message, TCSs are built for each Build TCS Message entry and each tactical alert that involves an aircraft with a new TCS is marked for TC APD block 510. TC APD block 512 is invoked for all strategic conflicts that include an aircraft with a new TCS.

Figure 7:
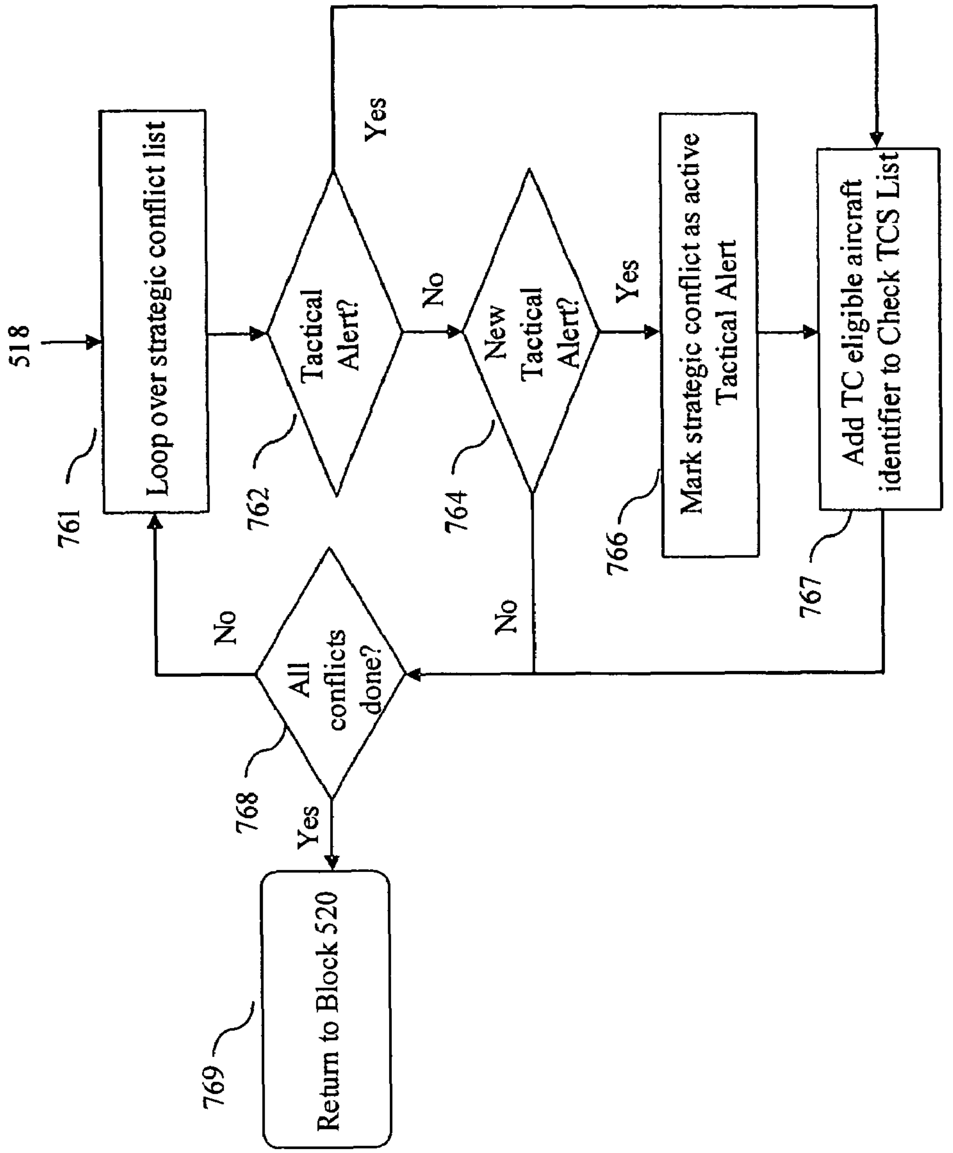
FIG. 7 is a representation of a flow chart to identify eligible aircraft that may require new or updated TCSs due to the clock timer event.

Referring to FIG. 7, the procedure of Block 518 starts in block 761 by starting a loop over the strategic conflict list. If a strategic conflict is a "Tactical Alert", "Yes" is returned from block 762. If "Yes", flow continues to block 767 where each aircraft identifier in an active tactical alert that is TC Eligible is added to the Check TCS List. Flow continues to block 768, where completion of the loop is checked. If in block 768 "All conflicts done?" is "No," more strategic conflicts remain to be processed, the flow continues to block 761 to process the next strategic conflict. Flow continues to block 762 where the strategic conflict is checked if it a tactical alert. Assuming "Tactical Alert?" is "No," flow continues to block 764 where the strategic conflict is checked, where it is now a tactical alert due to the clock timer event. In block 764, if the predicted conflict start time is less than or equal to the current time plus a predefined time interval the Maximum TC Lookahead Time, a "Yes" occurs. If "Yes", the strategic conflict is marked as an active tactical alert block 766. Each aircraft identifier in the tactical alert that is TC Eligible is added to the Check TCS List 767. If in block 764 a "No" occurs, that is a strategic conflict is not a new tactical alert, flow continues to block 768. After all strategic conflicts have been processed, block 768 is "Yes" and processing returns to block 520.

Figure 8:
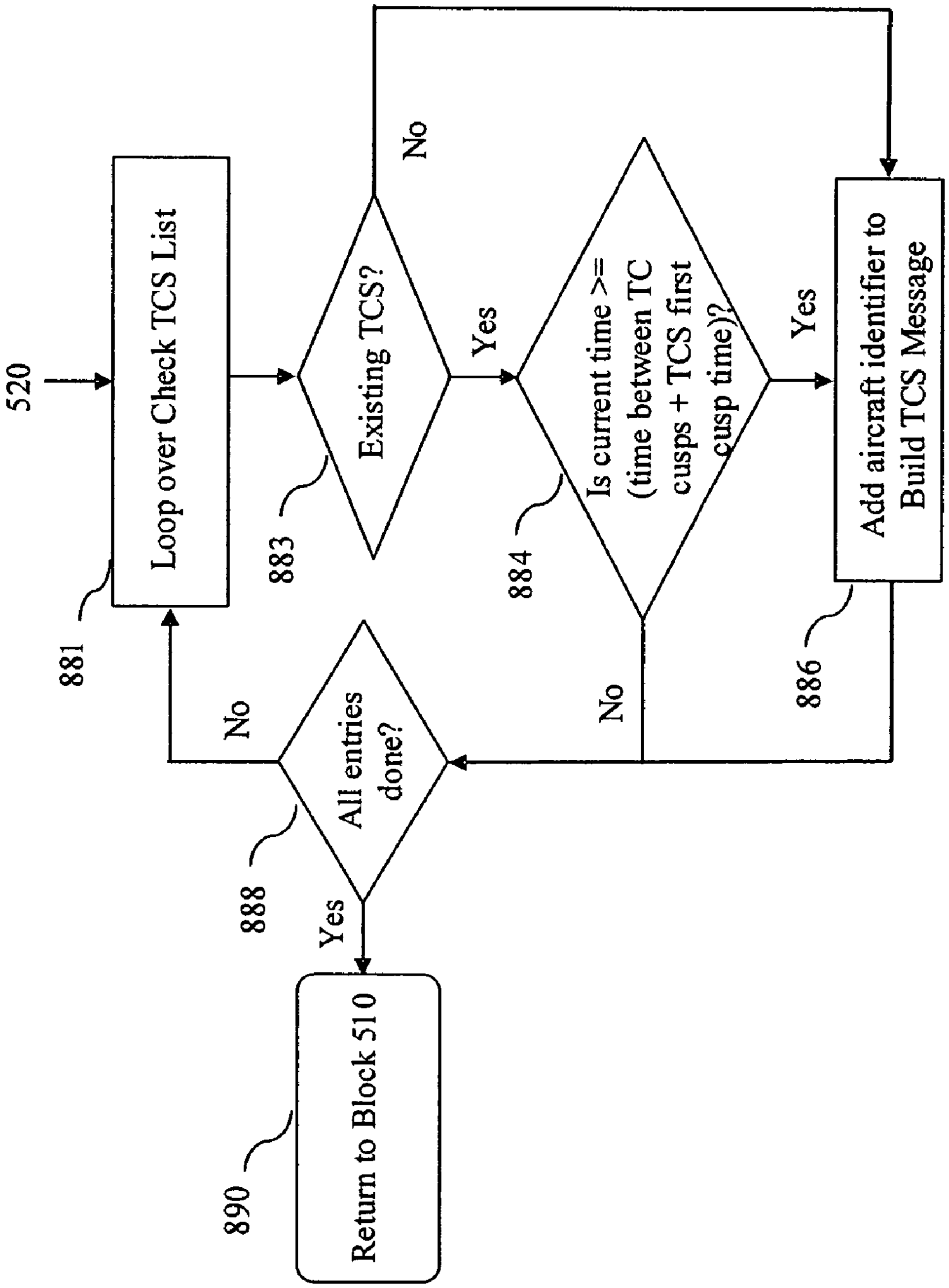
FIG. 8 is a representation of a flow chart to identify a list of aircraft that require TCSs due to the clock timer event.

Referring to FIG. 8, the procedure of block 520 starts in block 881 where the Check TCS List is made available and each entry is processed to determine a list of aircraft that require a new TCS. Flow continues to block 883 where aircraft that do not have a TCS record are identified. If block 883 is "No", processing continues to block 886 where the aircraft identifier is added to a Build TCS Message. Otherwise, assuming block 883 is "Yes", the aircraft record has an existing TCS, and the flow continues to block 884 where the TCS is checked to determine if an update is needed due to the clock timer event. If the current time is greater than or equal to the TCS first cusp time plus a predefined parameter Time Between TCS Cusps 884, the aircraft identifier is added to a Build TCS Message 886. If TCS update is not needed, block 884 is "No" and the flow continues to block 888. After all input records in the Check TCS List are processed, block 888 is "Yes", and the flow branches to block 890 which returns to FIG. 5 block 510.

New Track Reports. TC stimuli include monitoring track reports to check TCS conformance and eligibility. Referring to FIG. 5 block 502, track report data, TCSs, and a list of TC Eligible aircraft are made available to a Track Management process. If an aircraft has a new track report and a TCS, the Track Management process checks if a track position is outside of the TCS lateral conformance bounds 514. If an aircraft is found to be out of conformance with TCS segments, it is added to a Build TCS Message including the track offset distance from the trajectory. Secondly, the Track Management process checks if aircraft is no longer eligible for TC due to a loss of track data 514. If an aircraft is not eligible for TC, it is added to a Build TCS Message. When all track reports are processed, flow continues to block 510. Messages from Track Management include the aircraft identifier and the trajectory record index. If a flight has a simultaneous event that builds a new trajectory, the TC out of conformance along a prior trajectory is ignored.

In FIG. 5 Block 512, a new TCS is built for each entry in the Build TCS Message if the trajectory index in the message matches the trajectory index. Each strategic conflict that is a tactical alert and includes the aircraft identifier is marked for requiring TC APD. TC APD is invoked to reevaluate each marked Tactical Alert Block 512. If a TC conflict is found, the alert is displayed using the TCS conflict data. New alert data can change the alert severity (color) based on the horizontal minimum separation distance, and the predicted conflict start time. If no conflict is found, the strategic conflict is marked as deleted (not displayed), and the tactical alert is inactive. The strategic conflict data is maintained until the strategic conflict end time or until a new trajectory is built since the deleted strategic conflict is reevaluated if an aircraft is TC out of conformance or TC ineligible. A previously deleted alert would be redisplayed if the TC APD determines a conflict exits.

Thus, the number of displayed alerts can be reduced by modeling VCBs over the TC lookahead time. Re-evaluation of alerts at short warning time thresholds improves the timeliness of deleting displayed alerts. The predicted minimum separation distance can be improved by modeling TCSs over the TC lookahead time. The number of display notifications deleted early by this approach, using variable lateral conformance bounds, is estimated to be approximately 5 to 9 percent, based on the 1) average horizontal separation distance compared to the standard lateral separation distance and 2) the magnitude of the trajectory lateral conformance bound.

It should also be appreciated that various modifications, adaptations, and alternative embodiments thereof may be made within the scope and spirit of the present invention. The invention is further defined by the following claims.

What is claimed is:

1. A method of generating an aircraft tactical alert comprising:

receiving a track position for an aircraft;

receiving trajectory and static conformance bounds for the aircraft;

receiving a current trajectory position for the aircraft;

generating tactical check segments and variable conformance bounds for the aircraft based on the current trajectory position, the trajectory and static conformance bounds, default variable conformance bounds and the track position;

generating a tactical alert if the variable conformance bounds have a loss of Air Traffic Control separation standards relative to an object within a specified lookahead time; and providing to a user the tactical alert.

2. The method of claim 1, wherein the variable conformance bounds are asymmetric about projected tracks.

3. The method of claim 1, wherein the variable conformance bounds include step functions.

4. The method of claim 1, wherein the variable conformance bounds include continuously widening bounds up to the static conformance bounds.

5. The method of claim 1, wherein the variable conformance bounds are based on modifying the static conformance bounds in two spatial dimensions.

6. The method of claim 1, wherein the variable conformance bounds are based on modifying the static conformance bounds in three spatial dimensions.

7. A system for generating aircraft tactical alerts comprising:

means for receiving a track position for an aircraft;

means for receiving trajectory and static conformance bounds for the aircraft;

means for receiving a current trajectory position for the aircraft;

means for generating tactical check segments and variable conformance bounds for the aircraft based on the current trajectory position, the trajectory and static conformance bounds, default variable conformance bounds and the track position; means for generating a tactical alert if the variable conformance bounds have a loss of Air Traffic Control separation standards relative to an object within a specified lookahead time; and means for providing to a user the tactical alert.

8. The system of claim 7, wherein the variable conformance bounds are asymmetric about projected tracks.

9. The system of claim 7, the variable conformance bounds include step functions.

10. The system of claim 7, wherein the variable conformance bounds include continuously widening bounds up to the static conformance bounds.

11. The system of claim 7, wherein the variable conformance bounds are based on modifying the static conformance bounds in two spatial dimensions.

12. The system of claim 7, wherein the variable conformance bounds are based on modifying the static conformance bounds in three spatial dimensions.

13. The method of claim 1, wherein the object is variable conformance bounds of another aircraft such that a tactical alert is generated if the variable conformance bounds of the two aircraft have a loss of Air Traffic Control separation standards within the specified lookahead time.

14. The system of claim 7, wherein the object is variable conformance bounds of another aircraft such that a tactical alert is generated if the variable conformance bounds of the two aircraft have a loss of Air Traffic Control separation standards within the specified lookahead time.

* * * * *